(12) United States Patent
Shea et al.

(10) Patent No.: US 6,917,938 B2
(45) Date of Patent: Jul. 12, 2005

(54) COLLABORATIVE CONTEXT INFORMATION MANAGEMENT SYSTEM

(75) Inventors: Gabriel O. Shea, Littleton, CO (US); Andrew G. Psaltis, Littleton, CO (US)

(73) Assignee: IdeaPivot Corporation, Littleton, CO (US)

( * ) Notice: Subject to any disclaimer, the term of this patent is extended or adjusted under 35 U.S.C. 154(b) by 409 days.

(21) Appl. No.: 10/139,459

(22) Filed: May 6, 2002

(65) Prior Publication Data
US 2003/0208459 A1 Nov. 6, 2003

(51) Int. Cl.[7] .............................................. G06F 17/30
(52) U.S. Cl. ............................................ 707/7; 707/10
(58) Field of Search .................... 707/1–10, 100–104.1, 707/200–205; 715/530

(56) References Cited

U.S. PATENT DOCUMENTS

| | | |
|---|---|---|
| 5,436,909 A | 7/1995 | Dev et al. |
| 5,845,270 A | 12/1998 | Schatz et al. |
| 6,094,649 A * | 7/2000 | Bowen et al. ................. 707/3 |
| 6,314,427 B1 | 11/2001 | Goldman et al. |
| 6,317,749 B1 | 11/2001 | Ghatate et al. |
| 6,321,229 B1 | 11/2001 | Goldman et al. |
| 6,560,595 B1 * | 5/2003 | Sanders et al. ................ 707/2 |
| 2003/0097640 A1 * | 5/2003 | Abrams et al. ............. 715/530 |

OTHER PUBLICATIONS

"Semantic community Web portals" by S. Staab, et al., Computer Networks, published by Elsevier Science Publishers B.V., Amsterdam, N.L. Jun. 2000 vol. 33 No. 1–6pp. 473–491.

"Cat–a–Cone: An Interactive Interface for Specifying Searches and Viewing Retrieval Results using a Large Category Hierarchy" by Hearst, et al., proceedings of the 20th Annual International ACM–SIGIR Conference on research and development in information retrieval, Jul. 27, 1997 pp. 246–255 XP–000782010.

* cited by examiner

*Primary Examiner*—Mohammad Ali
(74) *Attorney, Agent, or Firm*—Patton Boggs LLP

(57) ABSTRACT

The collaborative context information management system comprises a system of networked context-aware databases that are capable of managing information in various interlinked collaborative contexts, recognizing a user's individual context, and applying this individual context across all collaborative contexts in the networked context-aware databases to provide users with exactly the information they need. The context information management system enables each information element to recognize its multiple contexts, how it is related to other contextual information, and how it inherits properties and attributes from the contexts in which it resides. The context information management system recognizes and then applies a user's present context across the networked context-aware databases to return exactly the data that is relevant to the user's information context. Finally, contextual collaboration between users is possible through the sharing and interlinking of contexts so that users discover, share, and use exactly the information they need.

16 Claims, 7 Drawing Sheets

COLLABORATIVE CONTEXT INFORMATION MANAGEMENT SYSTEM

FIELD OF THE INVENTION

This invention relates to the management and extraction of context-relevant information from data storage and management systems.

PROBLEM

It is a problem in data management systems to manage the information, that is embodied in the data, in various interlinked collaborative contexts, recognizing users' individual context and applying this individual context across all collaborative contexts to provide users with exactly the information they need.

Information is often relevant in more than one context; however, it is a problem that data management systems cannot handle information existing in multiple contexts and use this contextual information in combination with a user's current contextual situation to decipher what information is relevant to the user's current context. Furthermore, because information can exist in more than one context, in it is a problem that users cannot pivot between contexts to obtain different contextual perspectives of the same information.

Modern life depends on a rapid flow of high-quality information; yet, people are overwhelmed by having to find and create relevant information from a bewildering assortment of data. Information is data that has been endowed with contextual meaning. However, in spite of all the advances in information and data management technology, creating contextually relevant, high-quality information remains difficult and expensive. This is because each user of existing data management systems is responsible for performing the work required to transform data into contextually relevant information. Compounding this problem is the fact that information systems are often fragmented and contain inconsistent data. As a result, each user must: determine what data management systems are available; what data each system contains; what data inconstancies exist between systems; and finally, what data in each system are relevant. To actually create the information, a user must extract relevant data from each system, contextually relate and organize the data, and prepare it for use and dissemination. Because the burden of information management is borne almost entirely by people, people spend the majority of their decision-making time gathering information, but still can only employ a small fraction of applicable data to make strategic decisions. To make information easier to find, use, understand, and share, a departure from modern information and data management methodologies is needed.

The human mind uses context to manage a massive amount of information from a myriad of different contextual situations, such as work, family, friends, and community. Using context, people quickly decipher what information is relevant in a given situation. While context processing is essential to the human mind, it is absent from the modern information technology infrastructure. Database management systems in use today are completely incapable of assisting users with the combined task of finding, relating, understanding, using, and sharing information that is relevant to the user's context. Most data management systems are built on the assumption that there is only one data model, one "right" way to look at the information. All database users and software must know exactly what data they are looking for, how the database is modeled, what data it contains, how to access the data, and how to relate the data to other data that is retrieved from the same database. Essentially, databases today are data hoppers, excelling at storage and retrieval but unable to assist users to create, comprehend, manage, discover, and share the information contained in the data that is stored in the database.

Hierarchical and network databases use tree structure relationships to store data. Related data is stored and accessed together providing high-performance data retrieval. However, once the data model for the database is defined, changing relationships among the stored data becomes difficult and expensive, both in the database and in applications that are dependent on the database. Relational databases share many of the same problems of hierarchical and network databases. Data is stored in tables that are linked dynamically at runtime in accordance to a database schema. As a result, users and applications have to specify exactly how and what relationships to construct between the tables. Runtime relationship specification has made relational systems popular, but this flexibility comes at a high cost. All users and applications must be intimately familiar with the database relationship structure, and when these relationships change, users and applications are forced to relearn, rebuild, and retest all interactions with the database. Object database systems support an even greater degree of relationship complexity as compared to relational systems. However, they still do not support relationship flexibility. Objects consisting of data and application methods are stored in hierarchal relationships that support object-oriented inheritance of attributes and methods. Object databases can manage highly complex relationships while maintaining high performance. However, because of inheritance and data being commingled with application code, it is very difficult to alter data relationships without severely impacting dependent systems.

New database technologies have emerged in an attempt to meet the increasing demands for flexibility, personalization, and the ability to get the right information. Object/relational systems support simultaneous access to the same data through relational database or object database methodologies. However, altering relationships remains difficult and expensive due to the impact on the systems that are dependent on these relationships. Semi-structured databases support "self-describing" information, where relationships are flexible, but all users must fully understand what data is in the database and how to use that data. Associative databases allow the creation of associations between data that mirror how people would think. Relationships are built in accordance to noun-verb syntax and are completely flexible and match reality more closely. Associative databases have advantages over other databases in that relationships are easier for people to use, understand, and change. However, associative databases cannot actively help users find information related to the user's specific contextual needs.

Therefore, there presently exists no information or data management system that can contextually manage information, recognize a user's context, provide a user with information that matches their current context, and enables users to pivot contextual perspectives around a given piece of information.

SOLUTION

The above-described problems are solved and a technical advance achieved by the present collaborative context information management system that comprises a system of networked context-aware databases that are capable of managing information in various interlinked collaborative contexts. The context information management system recognizes a user's current context, and applies this individual context across all collaborative contexts in the networked context-aware databases to provide users with information relevant to their current context. The collaborative context information management system enables each information element stored in the context-aware databases to recognize its multiple contexts, how it is related to other contextual information, and how it inherits properties and attributes from the contexts in which it resides. The collaborative context information management system recognizes and then applies a user's present context across the networked context-aware databases to return exactly the data that is relevant to the user's information context. Finally, contextual collaboration between users is possible through the sharing and interlinking of contexts. This system can actively assist users discover, share, and use the contextually relevant information they need.

The context information management system greatly simplifies a user's task of obtaining relevant information from a computer by reducing the amount of explicit information that the user must provide to access the information. To be contextually aware, information management systems need to change and adapt to different contextual situations, remember history, filter out-of context information, and sense changes in context. The result is that the context information management system uses context to provide relevant information and/or services to the user, where relevancy depends on the user's present task. Additionally, contextual awareness enables users to gain access to more information than using traditional searching methodologies. Searching requires people to guess the words likely to occur in the information they are interested in. Any information not matching the search criteria is ignored—even if the information is very relevant. Contextual computing eliminates much of the guesswork associated with searching by providing useful or supporting information that is relevant to the current task, and by contextualizing the present task in a broader framework. By actively working for the user, the context information management system provides a user with high-quality relevant data while reducing the data overload commonly experienced using traditional database systems.

Thus, the context information management system fundamentally changes how people use computers to manage information, transfer knowledge, and learn. Instead of having people working for information, information will begin working for people. Context information management systems could revolutionize research, development, discovery, and learning around the world by enabling people to spend much less time locating, extracting, relating, and organizing data. Context information management systems will assist anyone, in any organization, share and disseminate knowledge and information. Instead of being burdened by the task of information management, people could focus on the excitement of learning, teaching, using, and sharing knowledge and information.

DETAILED DESCRIPTION

Figure 1:
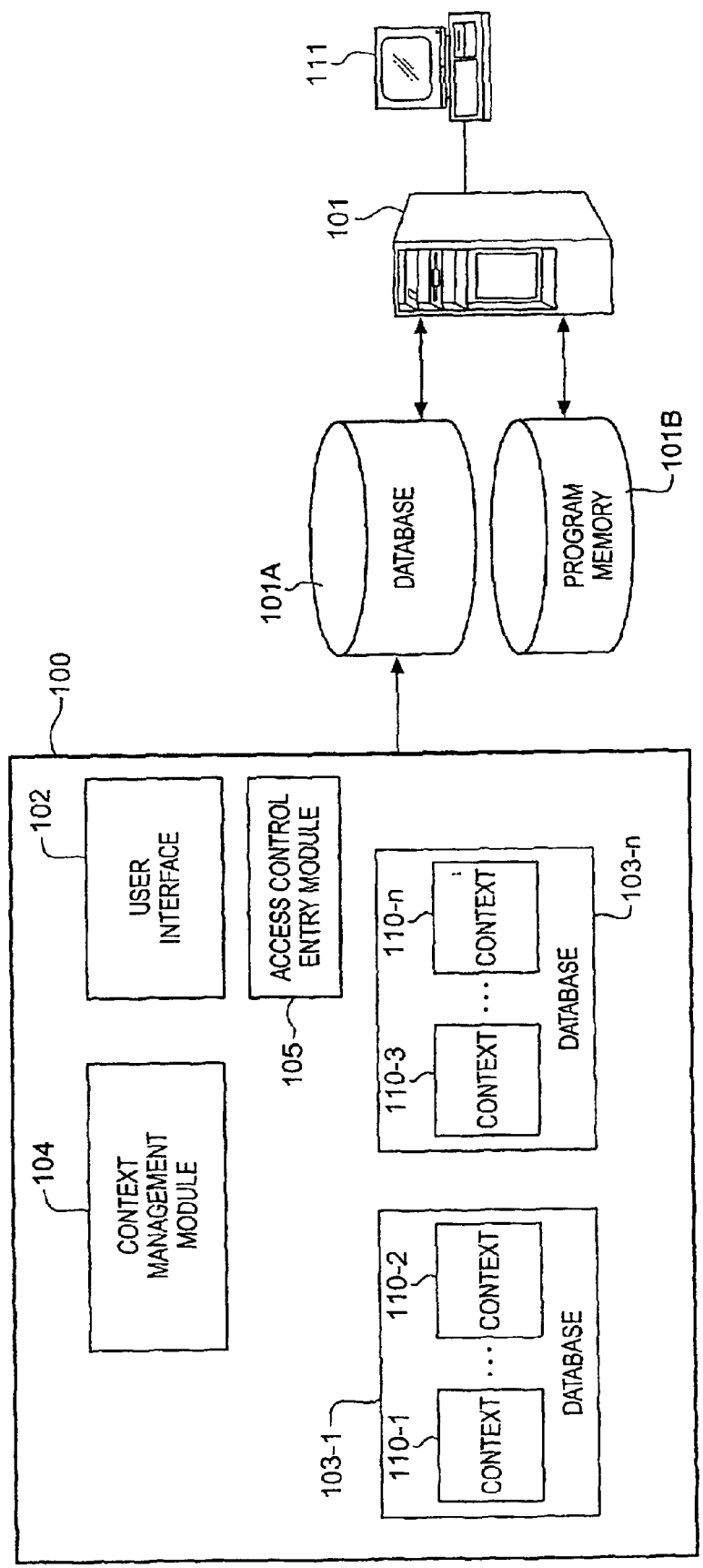
FIG. 1 illustrates in block diagram form the overall architecture of the collaborative context information management system.

The collaborative context information management system comprises a system of networked context-aware databases that are capable of managing information in various interlinked collaborative contexts, recognizing a user's individual context, and applying this individual context across all collaborative contexts in the networked context-aware databases to provide users with exactly the information they need. Furthermore, this collaborative context information management system enables users to pivot between contexts, thus enabling users to gain alternative contextual perspectives on the same information.

There are many benefits to the context information management system and these include the following:

Access to Knowledge and Information—users have increased access to knowledge and information, which are the keys to greater economic and social advancement.

Productivity—Users spend much less time and effort finding, gathering, and relating information.

Sharing—A user can create and share their own contextual information with their colleagues, customers, and partners.

All the right information, yet unconstrained—Since information is context sensitive, users see only the applicable information to their business problem. Context pivoting enables unlimited exploration of other contextual dimensions that information exists in.

Integration—Any type of data can be related, referenced, or stored.

An information expert at every desk—The context information management system 100 transforms any knowledge worker into a high performance expert by guiding them and helping them to find, use, and share all relevant information across the company.

Personalization—Everyone can create their own contexts that are applicable to their own personal contextual needs. These contexts can contain any type of data and be shared between users, groups, or even companies.

Security—All information is fully secure.

Flexible Software—The context information management system provides incredible flexibility, which can be harnessed to drive an application's behavior, personalization, and data.

Glossary

Context information management—An environment that provides contextual awareness to data contained within it.

Context—A hierarchical collection of data nodes.

Context aware—The ability for an information element to determine what context it is being used in.

Pivot—The ability to change which contextual inheritance is applied to the node that the pivot takes place on.

Standard nodes—A node is a container for the storage of an information element which can comprise data or a reference pointer that identifies data that is stored in another location. A node contains local properties that relate to the stored information element and also inherits properties from one or more parent nodes that are hierarchically superior in the presently active context.

Link nodes—The context sensitive inheritance link node connects with another node that is located in another context but only inherits properties from the presently active context. Thus, a link node interconnects two contexts to join the inheritance hierarchy of the two contexts at the nodes that are linked by the link node. When a link node is created, link node properties can be filtered by specifying the properties not to be seen. Additional properties can be added to the link node just like standard nodes.

Multiple Inheritance Link Nodes—The context sensitive multiple inheritance link node connects with another node that is located in another context but only inherits properties from the presently active context. Thus, a link node interconnects two contexts to join the inheritance hierarchy of the two contexts at the nodes that are linked by the link node. The multiple inheritance link node is context sensitive with simultaneous inheritance of properties from multiple specific contexts. When a multiple inheritance link node is created, the link node inherits from the present context as well as from the context that the link node was in at the time it was linked. When a link node is created, link node properties can be filtered by specifying the properties not to be seen. Additional properties can be added to the link node just like standard nodes.

Access Control Entry—A data structure that contains the access permissions for a user and/or group.

Access Control List—This is a list composed of Access Control Entities.

Architecture of the Collaborative Context Information Management System

The overall architecture of the collaborative context information management system is illustrated in block diagram form in FIG. 1. In particular, the collaborative context information management system 100 is typically embodied as a software product that is designed to execute on a processor 101 and memory 101A, using associated memory 101B to store the relevant data and associated context information. The access and control of the operation of the collaborative context information management system 100 is effected via the use of a User Interface 102 that enables a user at terminal device 112 to input the data that is managed by the collaborative context information management system 100 as well as the associative information that defines the interrelationships among the data. These hardware elements noted above are conventional in their design and the novel attributes of the collaborative context information management system 100 reside in the context-aware information management functions that are capable of managing information in various interlinked collaborative contexts, recognizing a user's individual context, and applying this individual context across all collaborative contexts in the networked context-aware databases to provide users with exactly the information they need. Furthermore, this collaborative context information management system 100 enables users to pivot between contexts, thus enabling users to gain alternative contextual perspectives on the same information.

As shown in FIG. 1, the collaborative context information management system 100 contains at least one "database" 103-1 to 103-$n$ that consists of a plurality of contexts 110-1 to 110-$m$, with each context comprising a hierarchical collection of data nodes. The contexts are managed by a Context Management Module 104 which defines the presently active context for a user and the inheritance of properties relevant to this context, as described below. The Context Management Module 104 also manages the pivoting between contexts. The collaborative context information management system 100 also includes an Access Control Entry Module 105 that is implemented in the preferred embodiment as a data structure that contains the access permissions for a user and/or group to access, modify and delete information elements from the system and to change the definition of a context. A User Interface Module 102 provides the communication interface that enables the user to input information and access information in the selected context of a selected database.

Contextual Inheritance Links

A context-aware database is created by a user when the user inputs data into the collaborative context information management system 100 to form a plurality of nodes, each of which stores an information element, typically comprising an atomic piece of data or a reference pointer that identifies data stored elsewhere, and the links among these nodes, each of which define a relationship among the nodes. Nodes, which contain contextually relevant properties, are typically linked into hierarchies of related information called contexts. In turn, these contexts can be interlinked. Links between and within contexts support parent-to-child inheritance of properties between nodes. There are three different scenarios for the inheritance on a given node: single inheritance, context-sensitive multiple inheritance, and/or simultaneous context-sensitive multiple inheritance. Moreover, nodes that inherit from multiple contexts are capable of what is called context pivoting. The following example sheds light on these concepts.

Figure 2:
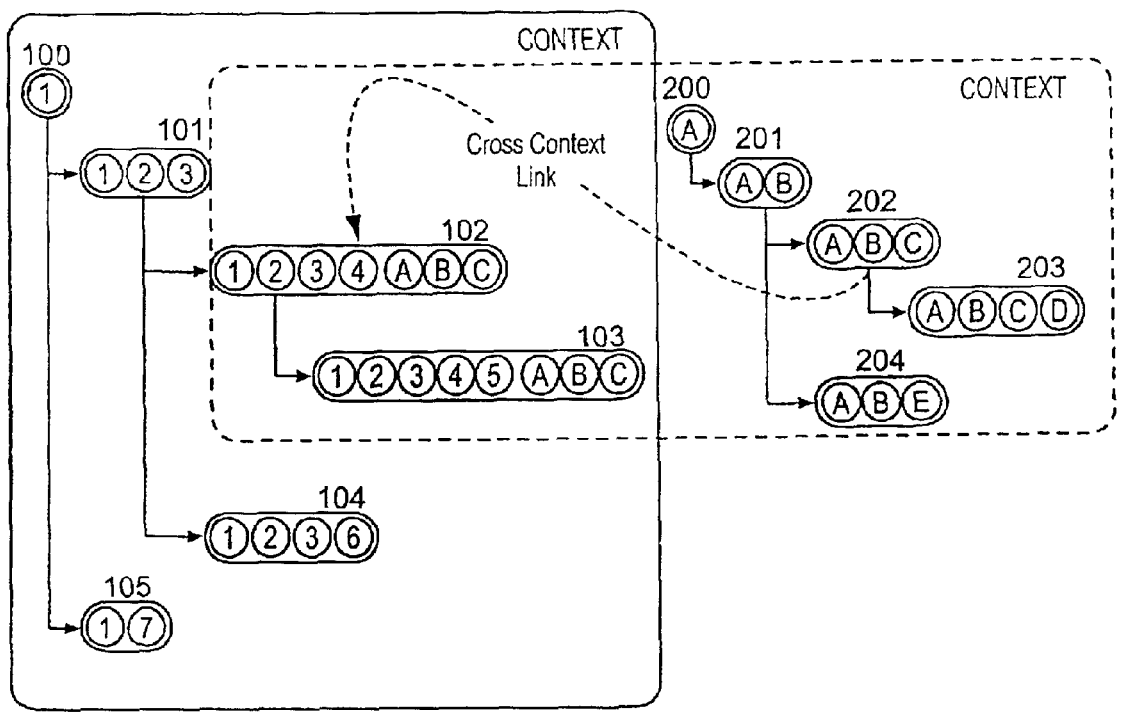
FIG. 2 illustrates a simple context network consisting of nine nodes organized into two contexts.

FIG. 2 illustrates a simple context network consisting of nine nodes organized into two contexts. One set of nodes are numbered 100–105 and comprise Context 110-1, while another set of nodes are numbered 200–204 and comprise Context 110-2. Arrows between nodes indicate the parent-child direction of relationships and the direction of inheritance. Single Inheritance is the dynamic real-time inheritance of properties from a parent data element to a child data element based on parent-child hierarchical relationships. Properties are either Local Properties which are contained within nodes, as indicated by the dark circles, or Inherited Properties which are obtained from a parent, as indicated by the gray circles. The two contexts noted above are associated via the cross-context link between nodes 202 and 102. Context pivoting is enabled on nodes 102 and 103 because of dual Context Inheritance enabled by the cross-context link.

Single inheritance in the realm of Context 110-1 exists between nodes 100 and 101. Node 100 contains the property (1) and its child, node 101, contains the local properties (2, 3) and also inherits the property (1) from its parent, node 100. Because neither node exists in another context, inheritance is limited to Context 110-1. To a user in Context 110-1, node 101 would appear as if it had both sets of properties (1, 2–3). In similar fashion, child node 104 contains the local property (6) and inherits properties (1–3) from its parent node 101. Child node 105 depends only on parent node 100 and therefore contains local property (7) but also inherits property (1) from its parent node 100.

Simple inheritance in the realm of Context 110-2 exists between nodes 200 and 201, where the local property (A) of node 200 is inherited by its child node 201, which contains local property (B). Child node 201 is itself a parent node to nodes 202 and 204, which contain local properties (C) and (E), respectively. Therefore, the set of properties for node 202 is the set of properties inherited from its parent node 201 and its own local properties, which set consists of properties (A–B, C). The set of properties for node 204 is the set of properties inherited from its parent node 201 and its own local properties, which set consists of properties (A–B, E). Finally, node 203 is a child node of parent node 202 and as such inherits properties (A–C) from parent node 202 and contains its own local property (D) to complete the set of properties (A–D).

In this set of hierarchical relationships illustrated in FIG. 2, there is an instance of multiple inheritances, where node 102 inherits properties from two parent nodes, 101 and 202. Thus, node 102 contains its own local property (4) and inherits properties (1–3) from its parent node 101 and properties (A–C) from its parent node 202, to result in a set of properties (1–4, A–C) for node 102. Since child node 103 depends exclusively on node 102 as its parent, node 103 contains its own local property (5) as well as the set of properties (1–4, A–C) inherited from its parent node 102. Node 103 therefore consists of the set of properties (1–5, A–C).

As can be seen from the directional arrow drawn on FIG. 2, the flow of inheritance of properties between Context 110-1 and Context 110-2 flows uni-directionally from node 202 to node 102. Therefore, none of the nodes 200–204 inherit any properties from the nodes 100–105, while only the nodes 102, 103 inherit properties from the set of nodes 200–204, and then only from node 202, since the link between these two sets of nodes connects node 202 to node 102 and its children, which consists exclusively of node 103.

Contextual focus determines what properties are visible on a selected node. In FIG. 2, nodes 102 and 103 are aware that they exist in two different contexts. Additionally, each node can recognize that a user is accessing the system using either Context 110-1 or Context 110-2. If the cross-context link is "standard", then nodes 102 and 103 exhibit "standard" context-sensitive inheritance. In such an instance, to a user in Context 110-1 that examines node 103, it would appear as if the node had only five properties (1–5). Conversely, to a user in Context 110-2, 103 would be completely different, having properties (4,5) and (A–C). These differences are a result of contextual perspective, or contextual focus. For a user in Context 110-1, properties (A–C) would be hidden because they are inherited from the out-of-focus context, while for a user in Context 110-2, properties (1–3) are out-of-focus. If the cross-context link, instead of being "standard", were "simultaneous" from the perspective of Context 110-2, then simultaneous context-sensitive inheritance would exist on nodes 102 and 103. If this were the case, users in Context 110-2 would perceive 103 as having all eight properties in focus (because the node is simultaneously inheriting from both Context 110-1 and 110-2), while users in Context 110-1 would still perceive the node as having only properties (1–5).

Context pivoting is the process of switching perspectives on a node that exists in multiple contexts. In FIG. 2, contextual pivoting is possible on nodes 102 and 103. When a user examines node 102 from the perspective of Context 110-1, the node has four properties that are in focus, (1–4) and three that are out-of-focus (A–C). However, if the user has permissions, the node indicates that it can pivot to Context II. If the user chooses to pivot, the node swivels its inheritance and the user's perspective to Context 110-2. If the cross-context link were "standard", node 102 would appear to have properties (4) and inherited properties (A–C) and be located in the hierarchy of Context 110-2. If the cross-link context were "simultaneous", node 102 would appear to have all seven properties and be located in the hierarchy of Context 110-2.

Flexibility

Contextual hierarchies are highly flexible and can be easily changed at any time. The location of a node can easily be changed to alter the inherited properties. Additionally, nodes can be linked so as to simultaneously exist in multiple contexts, as nodes 102 and 103 do in FIG. 2. This flexibility provides an almost unlimited potential for personalization, where every user could have their own contextual perspective of on same information.

Security

Security is controlled by a user's security context. A security context is a specialized type of contextual hierarchy that is used to determine what information can be made available to a user. Security is either at the node and context level where it controls both read and modify permissions and is typically managed by the Access Control Entry Module. Security and access rights could be defined at both the individual level, or for groups of users. Under tight security, only one person may be able to use a node or context, while all could access public information.

Contextual Memory

Figure 3:
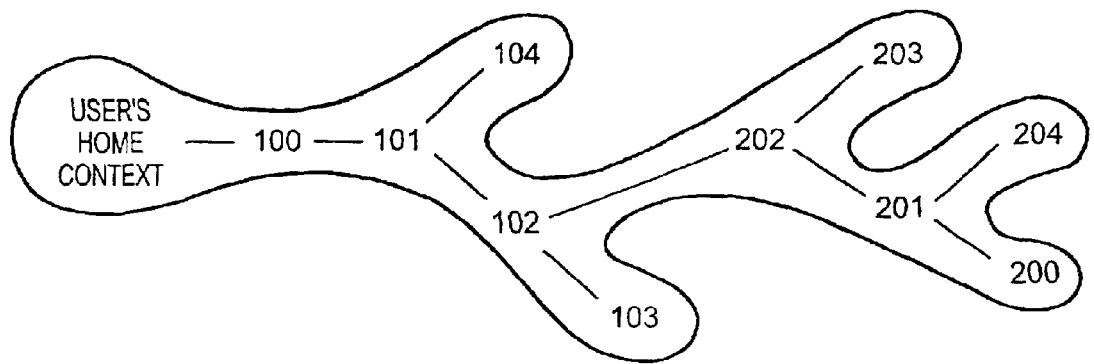
FIG. 3 illustrates the resulting contextual memory of a user navigating around the contexts of the collaborative context information management system.

Contextual Memory is a specialized configurable context that is used by the collaborative context information management system 100 to help find and retrieve information. With Contextual Memory the collaborative context information management system 100 can help users locate and return to contexts they explored in the past, as well as being the first place, outside of the user's current context, where a search is executed. In context databases, the Contextual Memory tracks the contextual path a user takes though the databases of the collaborative context information management system 100. FIG. 3 illustrates the resulting contextual memory of a user navigating around the contexts of the collaborative context information management system 100. The user started in their home context, searched and found node 100, navigated to all the nodes of Context 110-1 except for node 105, pivoted to Context 110-2 via node 102, and then fully explored Context 110-2. Contextual Memory is automatically pruned over time if not used. For example, if a person has not visited any of the nodes after a predetermined period of time, all leaf lobes are trimmed. As long as the node remains unvisited, after another predetermined time the context memory would have shrunk to only the user's home context.

Contextual Collaboration

Contexts, as well as individual nodes, can be easily shared among users and groups of users of a context network. Any owner of a context can enable sharing and control read-write access of the context or along branches in the hierarchical structure of the context. Sharing and permissions can be assigned to individuals or groups of individuals or opened for general consumption. Once shared, other people can use and even incorporated the shared information into their own contexts.

Context Searching

Searching uses the user's present context and memory context to return the most contextually relevant information. When a user performs a search, they are doing so from some sort of context. The search first explores the context that is in focus and begins to return any relevant results; the search is then expanded to the user's memory context along with out-of-focus contexts that are linked with the present context. If relevant information is still not found, the search is expanded to a network search where the user's current context is used as a filter to find other relevant information that the user has permissions to use. Thus, the collaborative context information management system 100 can perform an intelligent search for the user by navigating the contexts based on the user's past navigation as well as the past navigation of the context by other individuals.

Relationship Abstraction

Abstracting the relationships between an information element and the atomic data contained in the information element is a fundamental principle of the collaborative context information management database. This capability allows a user to dynamically change the relationships between data at run-time. The relationships that are changed may be global to the whole network or local to a specific user. In the relational world, this would be akin to having personal dynamic data schemas. This feature is the cornerstone to providing an environment that allows an unparalleled level of flexibility.

Node Property Management

Nodes enable the inert atomic data of an information element to become context aware, thus making inert data intelligent. Conceptually this can be thought of as sticking the inert atomic data into an intelligent envelope. The data therefore, never truly gains intelligence, but the envelope provides this facade. Every node in a context has the ability to contain its own properties and inherited properties. Node properties are conceptually very similar to attributes possessed by an object in an Object Orientated language. However, properties in a collaborative context information management database are much more powerful and flexible than those found in a modern object orientated programming language. Therefore, the requirements below are quite different from what you would find in the description of object attributes in object-orientated texts.

A property value may be an external reference that the database would manage. An external reference may be a filename, Relational Database Management System database connection, or any other information used to access a resource that is not stored in the collaborative context information management database. It is possible to store that type of information in the collaborative context information management database without this requirement. However, the management of such resources without this requirement is up to the user. This requirement would alleviate the user of such responsibility.

A property value may be a collaborative context information management system 100 Application extension. As such, the collaborative context information management database would invoke the application extension when a user accessed the property, passing it the appropriate information about the context, and node. This would have the net effect of the property returning a dynamic value that is no persisted.

A property may contain equations from the equation library. The collaborative context information management database would execute the equation when the user accesses a property that contains an equation. The behavior should mimic that of a spreadsheet, which executes an equation that may be contained in a cell. Without this requirement, a user can still store an equation as a string, and subsequently compute it after reading the property.

Context View and Sharing

Figure 6:
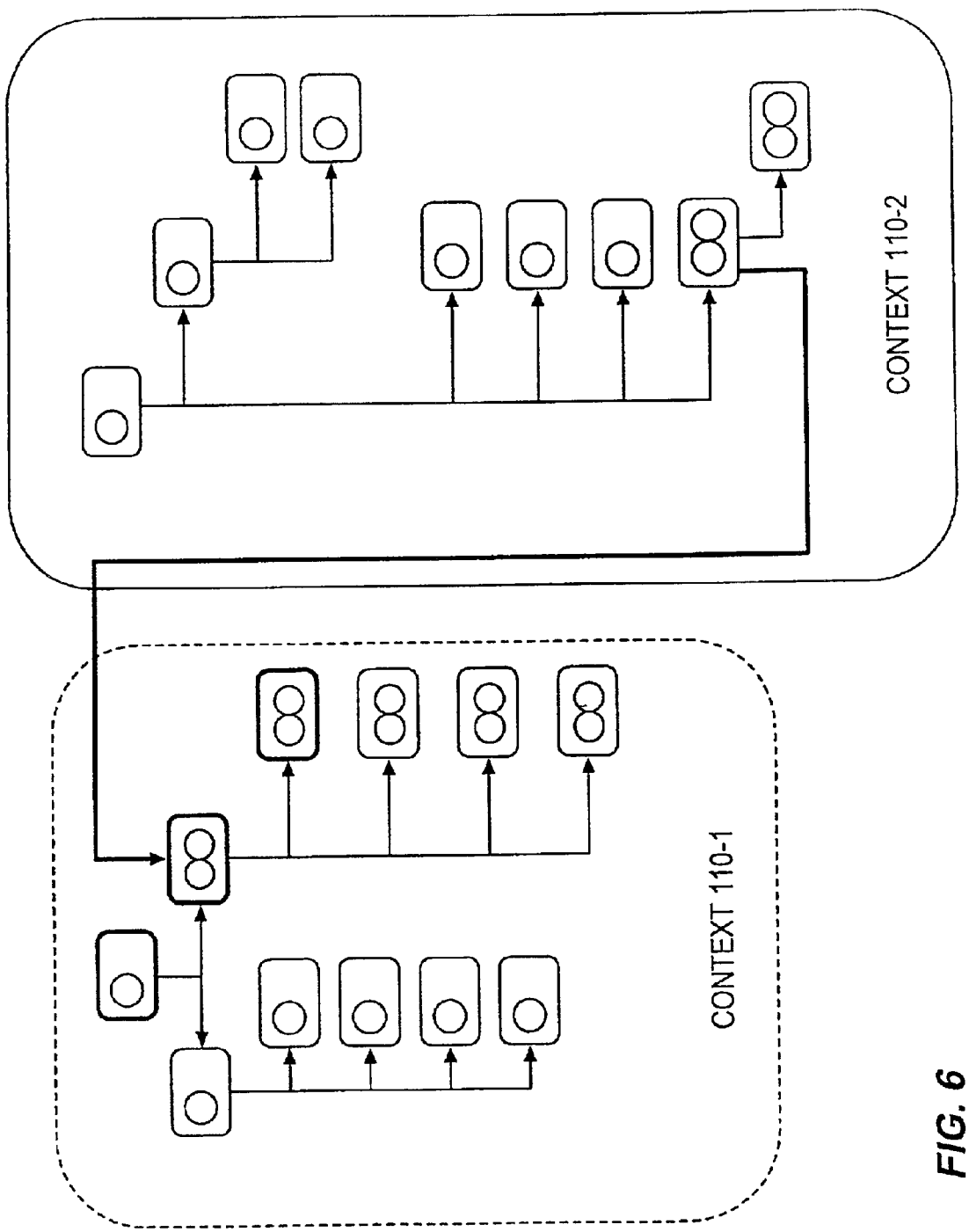
FIGS. 6–7 illustrate in block diagram form the contextual view and context pivoting feature of the collaborative context information management system.
Figure 7:
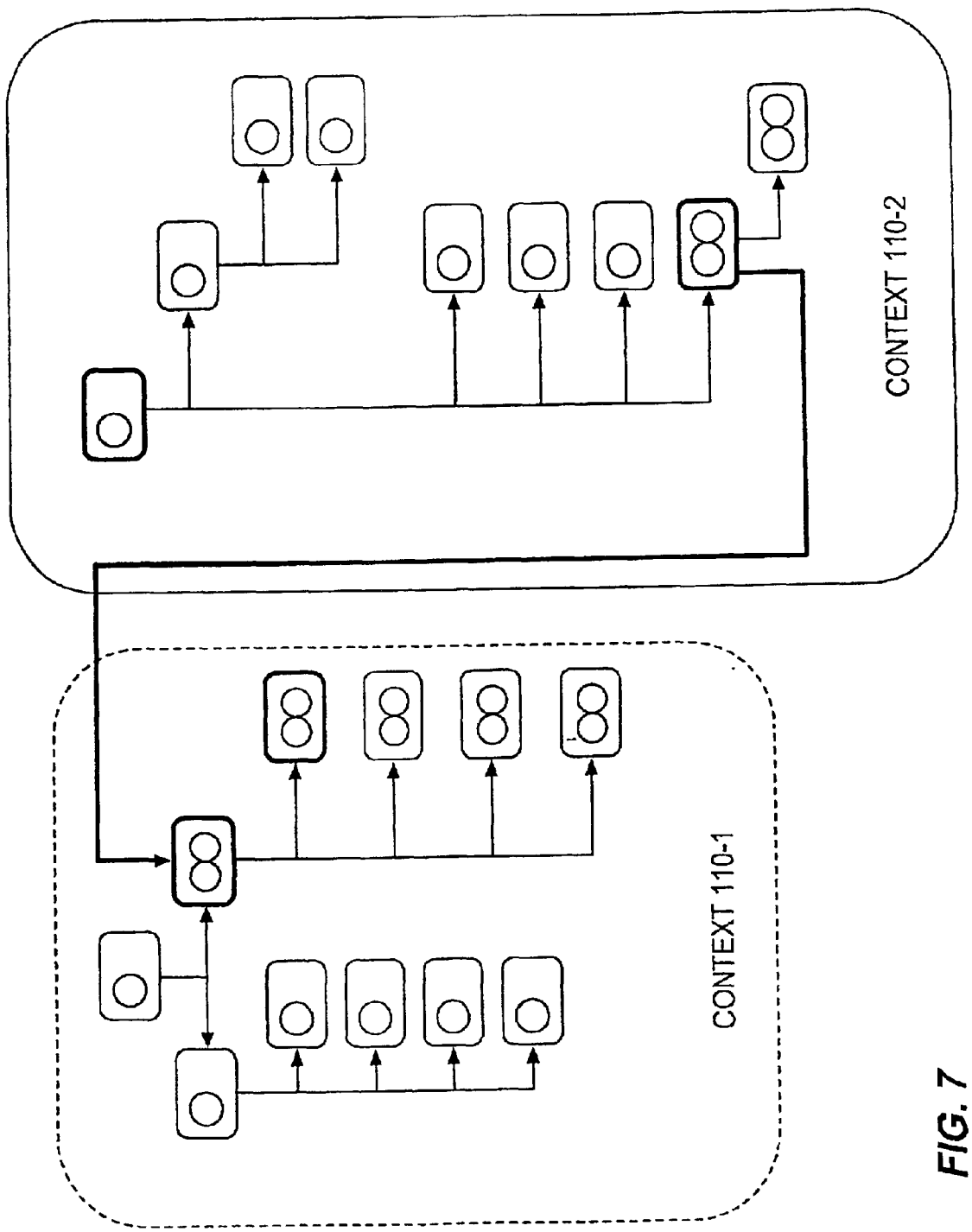

FIGS. 6–7 illustrate in block diagram form the contextual view and context pivoting features of the collaborative context information management system 100. In FIG. 6, the view of the information provided to the user by the collaborative context information management system 100 is illustrated. The user typically begins their navigation of the context 101-1 at the root node and traverses a plurality of nodes to, for example, child node 111. At this juncture, the user can view the local properties of child node 111 and the inherited context 110-1 properties, which properties are inherited only from hierarchically superior nodes in the context 110-1. The user does not view the properties inherited by child node 111 from context 110-2, but is provided with data indicative of the presence of alternative contexts.

Having the ability to share a context node, sub-context, or a whole context is a fundamental concept in the collaborative context information management system 100 environment. As, such it provides the foundation of which context pivoting and collaboration are built upon. Thus resulting in the ability for users to collaborate in real time and move freely across the collaborative context information management system 100 exploring various interrelated contexts. Conceptually there are two types of sharing: public and private. Public sharing is the ability to allow collaborative context information management system 100 users outside of an organization to gain access to a node, sub-context, or context. Private sharing is the ability to allow collaborative context information management system 100 users located within an organization to gain access to a node, sub-context, or context.

Context Pivoting

Every context node has a contextual focus, the context that it is currently being accessed in, many times a node exists in many different contexts, each of which being an out of focus context. When using a context node, it is extremely important for a user to be able to determine the out of focus contexts that the node exists in. At which time the user may wish to be able to change the in focus context or combine properties from one or more out of focus contexts with the in focus context. The human brain deals with this type of problem very elegantly, quickly allowing us to pivot our in focus context and also combine data from multiple contexts.

As shown in FIG. 7, users can pivot their contextual perspective on nodes that inherit properties from multiple parents. Context Pivoting enables a user to pivot their contextual perspective from their present context to another context that the node's data element is inheriting properties from. Once pivoted to a new context on a given data element, it is as if the user's "contextual track" indicates that they arrived at this data element by navigating via the new context. The system then recognizes the new context of the user and dynamically selects the most appropriate inheritances on the given node to invoke. This methodology results in capability of pivoting the user's perspective and pivoting the inheritance of the properties to those that are most appropriate to the user's new contextual perspective while not displaying properties that are not appropriate to the user's new context.

Context Sensitive Single and Multiple Inheritance

In all hierarchical structures the notion of a child inheriting from a single parent exists. In the collaborative context information management database, the same general principal is true. However, several advances in the concept have been made. Context sensitive single inheritance extends the traditional hierarchical single inheritance model by taking into account the context that a user is accessing it from.

Thus, as a node may exist in many different contexts, the inherited properties that it has at a given moment are specific to the in focus context that a user is accessing the node from.

Dynamic real-time multiple inheritance of properties from more than one parent data element to a child data element based on parent-child hierarchical relationships. Compile-time multiple inheritance does exist in information technology today, but is not very common outside of object-oriented programming languages. Objects in Object Oriented Databases, which contain both data and application code, can be made capable of multiple inheritance. Objects in Object-Oriented languages that support multiple inheritance enable descendant objects to inherit application methods and data from multiple parents.

This takes the concept of context sensitive single inheritance one step further. By allowing a node to inherit properties from more than one context at a time. Thus, the node is a child that may have N number of parents. This feature allows a user to create a very complex and rich node with very little work, resulting in reduced time spent gathering and relating information.

Dynamically selecting the real-time multiple inheritance of properties based on a users context—or navigational perspective. This tracks how a person moves through a hierarchy of data elements and uses this "contextual track" to dynamically choose the most appropriate inheritances to invoke. This methodology results in inheritance of the properties that are most appropriate to the user's perspective while not displaying properties that are not appropriate to the user's context.

Link Management

At the heart of the collaborative context information management system 100 is the context that a user creates which contains a collection of nodes, standard and/or either type of linked nodes. Thus, a user has the ability to create, retrieve, edit, and delete any number of contexts provided they have the appropriate privileges.

Taking advantage of sharing and supporting collaboration is the ability for a user to create a link node. There are two types of links nodes: Single Inheritance Link Nodes (SINL) and Multiple Inheritance Link Nodes (MILN). The primary concept of a link is that there is a link source and a link target. The link source is the node in an out of focus context, the link target is the node in the current context.

Context & Context Node Templates

The ability to have a boilerplate context to start with, may enable applications built on the collaborative context information management database and users of the database to be able to quickly get started using the product.

After a user has created a context and is using it, they have potentially created hundreds of context nodes. Providing them the ability to quickly create a node with very little effort may save significant time, help foster knowledge sharing, and provide a potentially more intelligent system if nodes are based on already created rich templates. When this feature is combined with the Context Templates feature, the result can be very powerful.

Example of Single Inheritance for a Ghost Node

Figure 4:
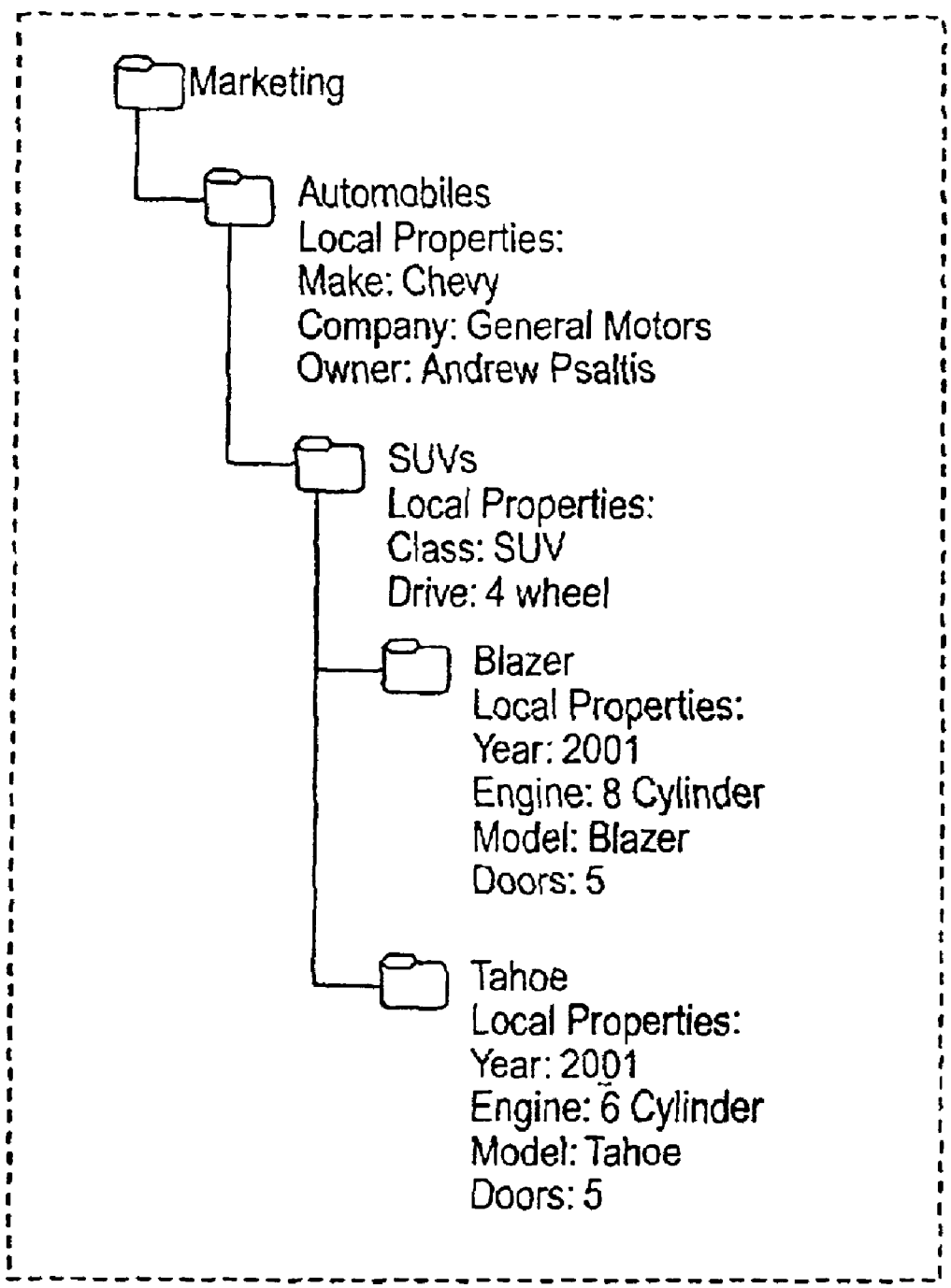
FIG. 4 illustrates in block diagram form the concept of single inheritance in the collaborative context information management system.

The concept of single inheritance in the collaborative context information management system 100 is illustrated by the example context node relationships of FIG. 4. In this example an automobile ownership inventory for a marketing context is implemented using a hierarchical arrangement of nodes where the various nodes have both local and inherited properties. In particular, the nodes each represent a datum point such as: Marketing, Automobiles, SUVs, Blazer, Tahoe. The user has organized these datum points in a predetermined relationship that represents a basic relationship among the datum points of increasing granularity of specific information as the context is traversed from the top down. Each datum point has a collection of local properties that are physically stored with the node and that relate to the datum point. Therefore, the datum point Tahoe has a collection of local properties consisting of: Year: 2001, Engine: 6 cylinder, Model: Tahoe, Doors: 5. There is also a set of inherited properties for this node that are inherited at run time. The inherited properties represent the collection of nodes and their local properties that are higher up the hierarchy in the context. Thus, the node Tahoe inherits the local properties that reside with the nodes SUVs and Automobiles. Therefore, at run time, the collaborative context information management system 100 populates a query of the node Tahoe with the inherited properties from the SUV node: Class: SUV, Drive: 4 wheel, as well as the node Automobiles with the inherited properties: Make: Chevy, Company: General Motors, Owner: Andrew Psaltis. The complete set of properties for a node comprise both the local properties and the inherited properties that are received from the hierarchically superior nodes in the particular selected context in the collaborative context information management system 100.

Example of Single and Multiple Inheritance Context Link Nodes for a Ghost Node

Figure 5:
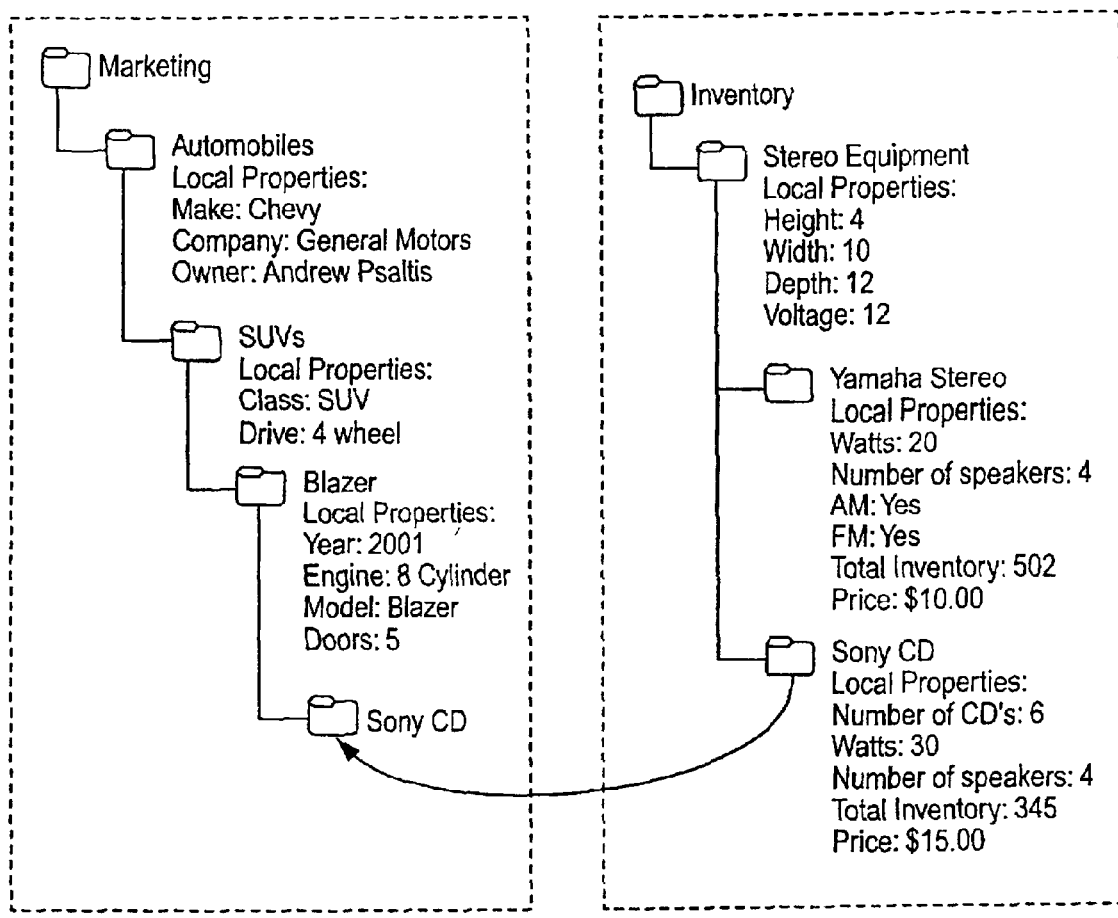
FIG. 5 illustrates in block diagram form the concept of single and multiple inheritance using a context link node in the collaborative context information management system.

The concept of single and multiple inheritance context link nodes in the collaborative context information management system 100 is illustrated by the example context node relationships of FIG. 5. In this example the automobile ownership inventory for a marketing context described above is implemented using a hierarchical arrangement of nodes where the various nodes have both local and inherited properties. In addition, an inventory context is implemented to track stereo equipment that is used for installation in the automobiles of the marketing context. In particular, the nodes each represent a datum point such as: Inventory, Stereo Equipment, Yamaha Stereo, Sony CD. The user has organized these datum points in a predetermined relationship that represents a basic relationship among the datum points of increasing granularity of specific information as the context is traversed from the top down. Each datum point has a collection of local properties that are physically stored with the node and that relate to the datum point. Therefore, the datum point Sony CD has a collection of local properties consisting of: Number of CD's: 6, Watts: 30, Number of speakers: 4, Total inventory: 345, Price: $15.00. There is also a set of inherited properties for this node that are inherited at run time. The inherited properties represent the collection of nodes and their local properties that are higher up the hierarchy in the context. Thus, the node Sony CD inherits the local properties that reside with the node Stereo Equipment. Therefore, at run time, the collaborative context information management system 100 populates a query of the node Sony CD with the inherited properties from the Stereo Equipment node: Height: 4, Width: 10, Depth: 12, Voltage: 12. The complete set of properties for a node comprise both the local properties and the inherited properties that are received from the hierarchically superior nodes in the particular selected context in the collaborative context information management system 100.

The use of a single inheritance link node enables a user to create a Ghost Node in the Marketing context which Ghost Node "Sony CD" in the Marketing context is a copy of the original Sony CD node that is located in the Inventory context. The Sony CD Ghost Node is a child node of the Blazer node in the Marketing Context and the local properties assigned to the Sony CD Ghost Node can be all or a subset of the local properties assigned to the Sony CD node located in the Inventory Context. Thus, when a user queries the Sony CD Ghost Node, he is linked to the Sony CD node and the link can filter the local properties of the Sony CD node to limit the access to the data stored therein. The access of the Sony CD Ghost Node provides the user with the filtered local properties of the Sony CD Ghost Node as well as all of the inherited properties from the Marketing Context, but not any inherited properties from the Inventory Context. In addition, the Sony CD Ghost Node can have its own local properties assigned to it, that are different than the local properties that are assigned to the Sony CD node in the Inventory Context.

The use of a multiple inheritance link node enables a user to create a Ghost Node in the Marketing context which Ghost Node "Sony CD" in the marketing context is a copy of the original Sony CD node that is located in the Inventory context. The Sony CD Ghost Node is a child node of the Blazer node in the Marketing Context and the local properties assigned to the Sony CD Ghost Node can be all or a subset of the local properties assigned to the Sony CD node located in the Inventory Context. Thus, when a user queries the Sony CD Ghost Node, he is linked to the Sony CD node and the link can filter the local properties of the Sony CD node to limit the access to the data stored therein. The user can also filter the inherited properties from the Marketing Context to limit the access to the data stored in the Marketing Context. The access of the Sony CD Ghost Node provides the user with the filtered local properties of the Sony CD Ghost Node as well as filtered inherited properties from the Marketing Context, as well as any filtered inherited properties from the Inventory Context. Thus, the user can pivot between the Marketing Context and the Inventory Context since the Sony CD Ghost Node appears to have multiple parents via the multiple inheritance link. The user is able to view only the inherited properties from the one context that is the presently active pivot, either the Marketing Context or the Inventory Context, not both simultaneously. In addition, the Sony CD Ghost Node can have its own local properties assigned to it, that are different than the local properties that are assigned to the Sony CD node in the Inventory Context.

Creation and Population of a Context and its Nodes

Figure 8:
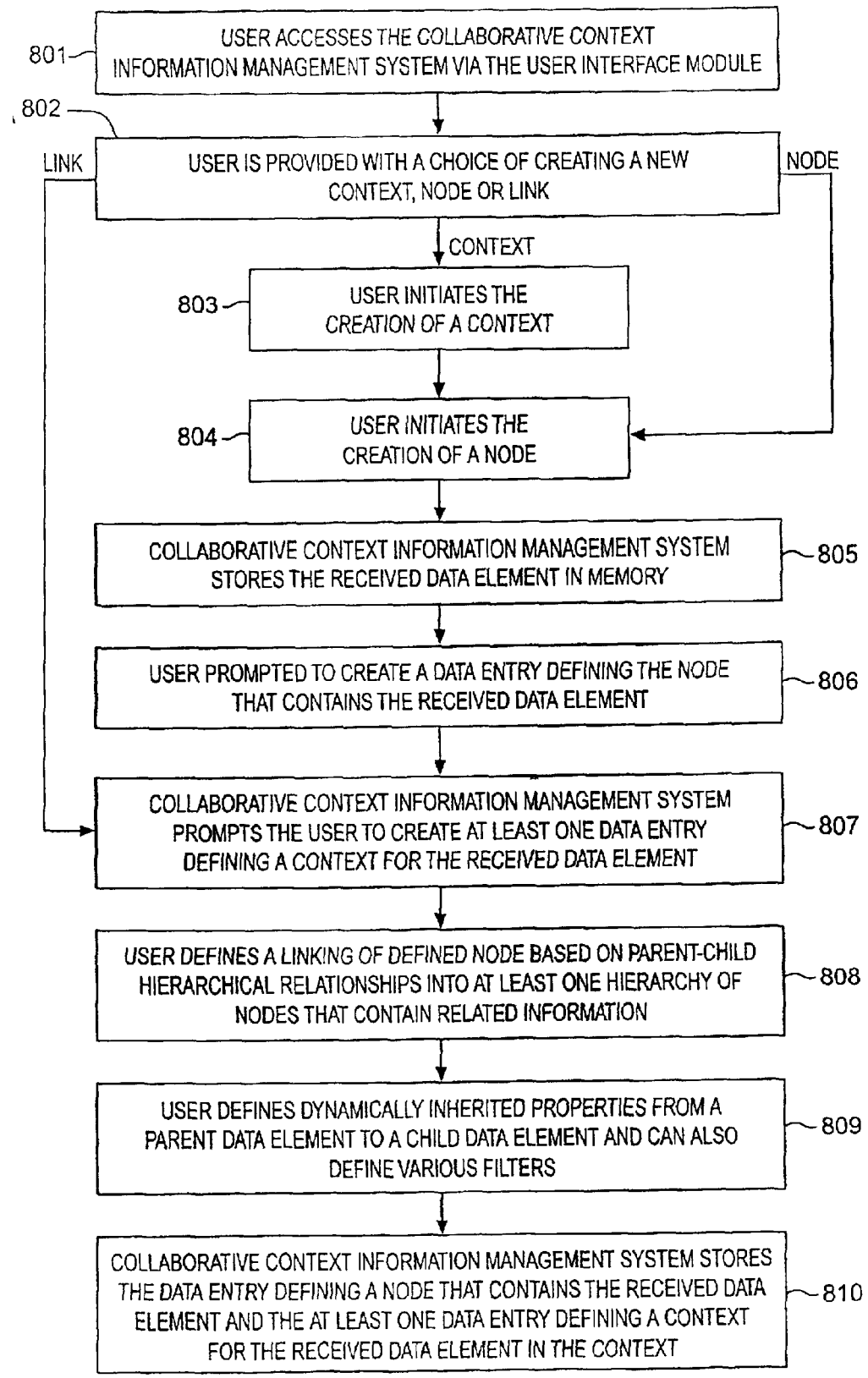
FIG. 8 illustrates in flow diagram form the operation of the collaborative context information management system in enabling a user to create a context and populate the context with nodes and links among nodes.

FIG. 8 illustrates in flow diagram form the operation of the collaborative context information management system 100 in enabling a user to create a context and populate the context with nodes and links among nodes. In particular, at step 801, the user accesses the collaborative context information management system 100 via the User Interface Module to initiate the creation of a context and/or nodes and/or links. The User Interface Module of the collaborative context information management system 100 typically contains user login and rights permission review processes to enable only authorized users to interface with the collaborative context information management system 100.

At step 802, the user is provided with a choice of creating a new context, node or link. For the purpose of example, a new context is selected and at step 803, the user initiates the creation of a context, providing the collaborative context information management system 100 with information that defines the context, its ownership, change permissions and the like. Since the context comprises a hierarchy of nodes, at step 804, the user initiates the creation of a node by the collaborative context information management system 100 by inputting a data element into the system. The collaborative context information management system 100, in response to receipt of a data element, stores the received data element in memory at step 805 and prompts the user at step 806 to create, in association with the received data element, a data entry defining the node that contains the received data element. At step 807, the collaborative context information management system 100 prompts the user to create, in association with the received data element, at least one data entry defining a context for the received data element. This is accomplished by the user defining a linking of said defined node based on parent-child hierarchical relationships into at least one hierarchy of nodes that contain related information at step 808. The user not only defines the dynamically inherited properties from a parent data element to a child data element based on parent-child hierarchical relationships but can also define various filters at step 809 to limit the inheritance of properties, as described above. The collaborative context information management system 100 at step 810 then stores the data entry defining a node that contains the received data element and the at least one data entry defining a context for the received data element in the context.

SUMMARY

The collaborative context information management system 100 comprises a system of networked context-aware databases that are capable of managing information in various interlinked collaborative contexts, recognizing a user's individual context, and applying this individual context across all collaborative contexts in the networked context-aware databases to provide users with exactly the information they need.

What is claimed:

1. A computer-implemented method for storing information in at least one database to enable contextual retrieval of said information by an information management system, comprising the steps of:
   creating an information element in response to receipt of a data element, comprising:
      storing said received data element in a database,
      creating in association with said received data element a data entry defining a node that contains said received data element,
      automatically creating in association with said received data element at least one data entry defining a context, including properties relating to a content of said received data element as well as a relationship to other data elements storing in said at least one database, for said received data element, comprising:
      defining a linking of said defined node into at least one hierarchy of nodes
      that contain related information;
         dynamically inheriting properties from a parent data element to a child data element based on parent-child hierarchical relationships; and
   storing said data entry defining a node that contains said received data element and said at least one data entry defining a context for said received data element in said database.

2. The method of claim 1 wherein said step of automatically creating at least one data entry defining a context for said received data element further comprises:
   inheriting properties from a plurality of parent data elements to a child data element based on parent-child hierarchical relationships in said at least one hierarchy of nodes.

3. The method of claim 1 wherein said step of automatically creating at least one data entry defining a context for said received data element further comprises:

dynamically inheriting of properties from multiple selected parent data elements to a child data element based on parent-child hierarchical relationships.

4. The method of claim 3 wherein said step of inheriting properties comprises:
tracking how a user moves through a hierarchy of data elements.

5. The method of claim 2 wherein said step of inheriting properties comprises:
inheriting properties from said at least one hierarchy of nodes from the presently active context.

6. The method of claim 5 wherein said step of inheriting properties comprises:
tracking how a user moves through a hierarchy of data elements.

7. The method of claim 2 wherein said step of inheriting properties comprises:
inheriting properties from said at least one hierarchy of nodes from the present context as well as from the context that the node was in at the time it was linked to said at least one hierarchy of nodes.

8. The method of claim 1 further comprising:
switching perspectives on a node that exists in multiple contexts.

9. A computer-implemented method for storing information in at least one database to enable contextual retrieval of said information by an information management system, comprising the steps of:
creating an information element in response to receipt of a data element, comprising, said information element comprising:
said received data element which is stored in a database,
a data entry defining a node that contains said received data element,
at least one data entry defining a context, including properties relating to a content of said received data element as well as a relationship to other data elements stored in said at least one database, for said received data element comprising:
defining a linking of said defined node into at least one hierarchy of nodes that contain related information;
dynamically inheriting properties from a parent data element to a child data element based on parent-child hierarchical relationships; and
storing said information element in said database.

10. The method of claim 9 wherein said step of creating an information element further comprises:
inheriting properties from a plurality of parent data elements to a child data element based on parent-child hierarchical relationships in said at least one hierarchy of nodes.

11. The method of claim 9 wherein said step of creating an information element further comprises:
dynamically inheriting of properties from multiple selected parent data elements to a child data element based on parent-child hierarchical relationships.

12. The method of claim 11 wherein said step of inheriting properties comprises:
tracking how a user moves through a hierarchy of data elements.

13. The method of claim 11 wherein said step of inheriting properties comprises:
inheriting properties from said at least one hierarchy of nodes from the presently active context.

14. The method of claim 13 wherein said step of inheriting properties comprises:
tracking how a user moves through a hierarchy of data elements.

15. The method of claim 10 wherein said step of inheriting properties comprises:
inheriting properties from said at least one hierarchy of nodes from the present context as well as from the context that the node was in at the time it was linked to said at least one hierarchy of nodes.

16. The method of claim 9 further comprising:
switching perspectives on a node that exists in multiple contexts.

* * * * *